Patented Oct. 25, 1932

1,884,772

UNITED STATES PATENT OFFICE

BORIS N. LOUGOVOY, OF NEW YORK, N. Y., ASSIGNOR TO CHADELOID CHEMICAL COMPANY, OF NEW YORK, N. Y., A CORPORATION OF WEST VIRGINIA

LOW WAX NONHYDROCARBON FINISH REMOVER

No Drawing.  Application filed December 12, 1928. Serial No. 325,652.

This invention relates to a lacquer remover which does not contain any hydrocarbon solvents and particularly relates to a remover in which ethyl acetate is used as a wax solvent.

The object of this invention is to provide a finish remover capable of general use and particularly valuable for its specific softening and loosening action on nitrocellulose lacquer.

Nitrocellulose solutions have been made the basis of coating compositions employed in finishing automobiles and the like. Benzol and other hydrocarbons have no substantial solvent effect thereon. While removing compositions, even if they contain, for example, fifty per cent of benzol, will act on such coatings, much better effects are obtained by the substantial elimination of any non-solvent for nitrocellulose. A common finish remover employed at the present time is composed of benzol, serving as a wax solvent, acetone, alcohol, and a waxy material. Benzol, toluol and similar hydrocarbons are known to have practically no solvent action on cellulose esters, such as nitrocellulose. The presence of such non-solvents is further found to slow down the dissolving of nitrocellulose in the nitrocellulose solvents present. These hydrocarbon solvents usually act as wax solvents and as penetrating solvents when the remover is used on an oil painted surface.

In the present invention hydrocarbon wax solvent preferably is not employed, at least in any substantial proportion, the essential solvents being ethyl acetate admixed with one or several co-operating solvents. Ethyl acetate has the property of dissolving mineral waxes, such as paraffin or ceresin, in sufficient quantities so that the solution when exposed on a coating of paint or varnish will yield an evaporation-retarding film and permit the ethyl acetate and other solvents incorporated with it to exert solvent action on the finish coating. The proportion of wax which ethyl acetate will dissolve is substantially greater than the traces which might go into solution in the case of what is commonly regarded as "wax non-solvents", namely, methyl and ethyl alcohol, acetone, methyl acetone and the like. These wax non-solvents commonly employed in paint and varnish removers require the presence of benzol, toluol, petroleum hydrocarbons, or some other pronounced wax solvent, to permit the presence in the composition of wax in a form capable of yielding an evaporation-retarding film. Such requirement is not necessary with respect to ethyl acetate in that it does dissolve wax adequately to form a film. However, the proportion of wax varies with the temperature, being somewhat less soluble when the solution is cold. To retard the evaporation sufficiently for the successful use of a solvent requires a proportion of wax adequate to yield a substantially continuous film or blanket of wax over the surface of the solvent.

Considering the composition from another standpoint, ethyl acetate in common with solvents, such as acetone and the like, has a good solvent action on nitrocellulose. Benzol on the other hand is a non-solvent for these bodies. A removing composition containing a large proportion of benzol therefore does not have as good a removing action in most cases on coatings of nitrocellulose.

Acetone, methyl acetone, anhydrous methyl alcohol and the like, have a useful solvent action upon nitrocellulose coating but these solvents will not retain a sufficient amount of mineral wax to result in the form of an impervious waxy film on exposure.

Ethyl acetate, therefore, having a solvent action on such mineral waxes, resulting in the possibility of introducing into ethyl acetate enough wax to form a protective film, is particularly desirable as the principal ingredient in a remover designed for action on surfaces coated with nitrocellulose solutions. On the other hand when making a paint and varnish remover it obviously would be more desirable to have such a remover possess sufficient activity when it is used on surfaces coated with other kinds of paints, such as old oil paints or varnishes. Although a very effective solvent on nitrocellulose lacquers, ethyl acetate is not so effective a solvent for oil paints.

The next lower homologues of ethyl acetate, that is, methyl acetate, on the other hand has a very good removing action both on nitrocellulose paint and on an ordinary oil paint or on varnishes. Methyl acetate, however, scarcely possesses the property exhibited by ethyl acetate of exerting a solvent action on waxes and also has the substantial disadvantage of being very volatile. A mixture of these two solvents has a good activity on all sorts of painted surfaces, including nitrocellulose coatings, but even in the presence of wax the evaporation of this mixture is too rapid to be of practical value and this difficulty cannot be overcome by increasing the amount of wax.

I have observed that, generally speaking, in order to obtain a mixture of two solvents containing a stipulated amount of wax yielding a composition which will have a low rate of evaporation, the following should be observed: Employ a wax precipitant which has a lower volatility than the solvent which is used to bring the wax into solution. In this particular case ethyl acetate, which is a wax solvent, has a lower volatility than methyl acetate and, therefore, the mixture is not sufficiently active.

I have also observed that when a volatile wax precipitant is desired in the mixture and when at the same time it is necessary to prevent a high rate of evaporation, this can be accomplished by the introduction of an additional or supplemental solvent of the nature of a wax precipitant which has a higher boiling point (lower volatility) than the wax solvent. I have found that when methyl acetate is used with ethyl acetate the addition of such a solvent as "lugosol" to the mixture of these two acetates will produce the necessary reduction in rate of evaporation to permit the utilization of the desired properties of the two acetates. The solvent referred to above under the name of "lugosol" is composed of various acetone condensation products. This solvent is made by treating acetone with a small amount of alkali, such as alkali metal hydroxides or hydroxides of alkaline earths. The product resulting from the condensation is preferably just neutralized with an acid and distilled over to separate the greater part of the unconverted acetone. The higher boiling portion of the solvent is collected separately and constitutes the solvent referred to above under the name of "lugosol." This solvent has a boiling point ranging from 60° C. up to 170° C. For example: while a mixture of equal parts of ethyl acetate and methyl acetate, containing one per cent of paraffin wax, had a rate of evaporation corresponding to a loss in two hours of over fifty per cent by weight of solvents, with the sample exposed to the air at temperature of 72-75° F. in an open dish in a layer of about 7 mm., a mixture composed of:

| | Parts |
|---|---|
| Ethyl acetate | 40 |
| Methyl acetate | 30 |
| "Lugosol" | 30 |
| Paraffin wax | 1% | showed no loss in weight within two hours under the same conditions and only about four per cent loss in twenty-four hours.

Other solvents, such as methyl or ethyl alcohol, methyl ethyl ketone and the like, can also be used in admixture with ethyl acetate and methyl acetate, but I have found that the addition of "lugosol" produces a more active remover.

The activity or cutting action was measured by placing approximately an equal amount of each sample on a panel from an automobile finished with an oil paint and the time was noted by means of a stop watch when the wrinkling of the finish was plainly noticeable. The number of seconds which elapsed before the appearance of such wrinkling was adopted as a relative characteristic of the speed of the paint and varnish remover.

When ethyl acetate containing one per cent of wax was tested by this method, the wrinkling of the surface did not appear within one hour's time. Using a mixture of equal parts of ethyl acetate and anhydrous methyl alcohol, with one per cent of wax, there was no blistering or wrinkling effect but the surface softened sufficiently to be scraped with a putty knife within about twenty minutes. With a mixture of equal parts of methyl and ethyl acetates with one per cent of wax, pronounced blistering appeared after about three hundred seconds from the moment the remover was placed on the surface. Using a mixture of:

| | Parts |
|---|---|
| Ethyl acetate | 40 |
| Methyl acetate | 30 |
| "Lugosol" | 30 |
| Paraffin wax | 1% | the wrinkling appeared in three hundred and sixty seconds time. This shows that the last mixture having a good rate of evaporation was at the same time about as effective as a mixture of methyl and ethyl acetate. It should be noted that elimination of methyl acetate from the mixture usually results in a decrease in the activity of a remover. For example: A mixture of

| | Parts |
|---|---|
| Ethyl acetate | 50 |
| "Lugosol" | 25 |
| Anhydrous methyl alcohol | 25 |
| Paraffin wax | 1% | had a cutting speed of five hundred seconds as measured on the same surface as described above.

While the above mixtures serve as examples of removers of the type described in the present specification, I do not want to restrict myself to the exact compositions or proportions of the ingredients which may vary according to various particular requirements.

From the above examples it should be noted that in all compositions containing ethyl acetate as a wax solvent and which do not contain any hydrocarbon solvents, the amount of wax necessary to obtain a good retarding action is rather small. Even the one per cent used in the above examples is in excess with respect to the formation of a wax film, the excess serving the purpose of producing a sufficient "body" for the remover.

Paint and varnish removers when used in practice should have a certain degree of consistency in order that they will not run too easily when placed on inclined surfaces and therefore if too little wax is used—sufficient only for the formation of a film—the remover will be too fluid and will drain away too fast, which in turn will result in poor activity of the remover due to the short time of contact of the remover with the coated finish. On the other hand the increase in body of a remover by means of incorporating a larger amount of wax is not desirable because, in addition to the fact that an increase in wax incorporated in the remover slows down the removing action of the solvents, any such increase may result in the possible increase of wax deposit after the remover is wiped off from the surface. Such a wax deposit is one of the drawbacks of lacquer removers containing wax as an evaporation retarder. Any wax deposit left on the surface should be washed off very carefully before another coat of lacquer is applied to the surface. Nitrocellulose is very sensitive to the presence of even a trace of wax on the surface to be finished. The wax will not only decrease adhesion of the coating to the surface but will retard the drying and produce a spotty surface.

Therefore the possibility of using a very small proportion of wax presents a desirable feature of ethyl acetate paint and varnish removers.

In this specification and in the appended claims the term "non-hydrocarbon" is intended to cover the substantial absence of hydrocarbons per se and the absence of chlorinated or other halogenated hydrocarbons, which substances have heretofore been many times proposed, in the art, as wax solvents.

While I have had the best results, with removers containing about 70% together, of methyl acetate and ethyl acetate, I do not restrict myself to this exact proportion, but reserve a variation of 5 to 10% above or below this figure.

"Lugosol" referred to herein is a composite material readily prepared by adding a small amount, say 0.02 or 0.03% of caustic soda, caustic potash, lime, baryta or strontia, to a bulk of neutral acetone, allowing the mixture to stand for at least 16 hours, carefully neutralizing the alkali, and fractionally distilling, collecting separately a fraction distilling between about 60 and 170° C. This latter fraction, I term "lugosol" and the term is so used throughout this case.

What I claim is:

1. A non-hydrocarbon, substantially non-volatile finish remover having a wax content of not substantially over one per cent, and comprising a wax and a solvent composed of a mixture of ethyl acetate and methyl acetate and a solvent in which the wax is insoluble, which is less readily volatile than said acetate, such a remover containing not substantially less than 70% of said acetates.

2. A non-hydrocarbon, substantially non-volatile finish remover having a wax content of not over one per cent, comprising a wax and a solvent composed of a mixture of ethyl acetate and methyl acetate, and also comprising high boiling ketonic solvents constituting the alkali-polymerization products of acetone distilling between about 60 and about 170° C., such remover containing not substantially less than 70% of the above organic esters.

3. A non-hydrocarbon, substantially non-volatile finish remover having a wax content of not over one per cent, comprising a wax and a solvent composed of a mixture of ethyl acetate and methyl acetate, and also containing liquid mixed alkali polymerization products of acetone including fractions substantially less volatile than ethyl acetate, such liquid polymerization products distilling between about 60 and about 170° C., the major part of the entire remover being composed of said acetates.

4. A finish remover adapted to remove lacquer coatings, containing substantially less than 3% of wax, in a composite solvent composed essentially of 60 to 80% of a mixture of ethyl acetate and methyl acetate and 20 to 40% of "lugosol," such remover having a low rate of evaporation, and being substantially free from hydrocarbons and from chlorinated hydrocarbons.

5. A composite finish remover which is substantially free from hydrocarbon and halogenated hydrocarbon wax solvents, and containing ethyl acetate as its essential wax solvent, together with a small percentage of dissolved wax, such remover containing co-operating solvent material selected from the herein described group consisting of methyl acetate, "lugosol" methyl alcohol, acetone, such remover showing an evaporation loss, when exposed to the atmosphere as a thin layer, for two hours, at about 72–75° F., of below 10%.

6. A composite finish remover which is substantially free from hydrocarbon and halogenated hydrocarbon wax solvents, and containing ethyl acetate, as its essential wax solvent, together with a small percentage of dissolved wax, such remover containing cooperating solvent material including methyl acetate and another organic solvent which is less readily volatile than methyl acetate, the total amount of such esters being not substantially below 70% of the entire remover.

In testimony whereof I affix my signature.

BORIS N. LOUGOVOY.